(12) United States Patent
Tominaga

(10) Patent No.: US 9,460,819 B2
(45) Date of Patent: Oct. 4, 2016

(54) CONTROL ROD-DRIVING CONTROL APPARATUS AND A METHOD THEREOF

(71) Applicant: Kabushiki Kaisha Toshiba, Minato-ku (JP)

(72) Inventor: Shinya Tominaga, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 336 days.

(21) Appl. No.: 14/284,835

(22) Filed: May 22, 2014

(65) Prior Publication Data

US 2014/0348285 A1 Nov. 27, 2014

(30) Foreign Application Priority Data

May 24, 2013 (JP) .................. 2013-110111

(51) Int. Cl.
*G21C 7/16* (2006.01)
*G21D 3/00* (2006.01)

(52) U.S. Cl.
CPC ................ *G21D 3/001* (2013.01); *G21C 7/16* (2013.01); *Y02E 30/39* (2013.01)

(58) Field of Classification Search
CPC ......... G21C 7/16; G21C 7/117; G21D 3/001
USPC .......................... 376/217, 230, 237, 258, 259
See application file for complete search history.

(56) References Cited

U.S. PATENT DOCUMENTS

| | | | | |
|---|---|---|---|---|
| 4,489,036 A | * | 12/1984 | Jamrus ..................... | G21C 7/16 376/229 |
| 4,600,962 A | * | 7/1986 | Bliehall .................. | G06F 11/00 340/3.42 |
| 4,752,433 A | * | 6/1988 | Altman .................... | G21C 7/16 376/230 |
| 5,446,774 A | * | 8/1995 | Russell .................... | G21C 7/16 33/533 |
| 6,798,859 B1 | * | 9/2004 | Steiner .................... | G21C 7/36 137/814 |
| 2002/0122520 A1 | * | 9/2002 | Ishii ........................ | G21C 7/16 376/230 |

FOREIGN PATENT DOCUMENTS

JP 6-174878 * 6/1994 ............... G21C 7/16

OTHER PUBLICATIONS

Lee, "The Control Rod Speed Design for the Nuclear Reactor Power Control Using Optimal Control Theory", Journal of the Korean Nuclear Society, vol. 26, No. 4, pp. 536-547, Dec. 1994.*
U.S. NRC, "Multi-plant Issue B-56, Control Rods Fail to Fully Insert", (Generic Letter No. 81-24), Jun. 15, 1981.*
nppdes.blogspot.com, "Reactor startup sequences | Nuclear Power Plant Design", 3 pages, Oct. 2012.*

* cited by examiner

*Primary Examiner* — Jack W Keith
*Assistant Examiner* — Daniel Wasil
(74) *Attorney, Agent, or Firm* — Oblon, McClelland, Maier & Neustadt, L.L.P.

(57) ABSTRACT

According to one embodiment, each of driving mechanisms is differently connected to one of control rods located in a nuclear reactor. A driving mechanism drives a connected control rod to be inserted and withdrawn with a high-pressure driving water by opening and closing control valves thereof. Driving time data of unlatch, insertion, withdrawal and settle of each control rod, is stored. The driving time data is measured by a test of insertion and withdrawal at a periodical inspection before starting operation of the nuclear reactor. At least one is selected from the control rods, based on a command to select and drive a control rod. A timing table that prescribes timings to open and close each control valve to unlatch, insert, withdraw and settle the selected control rod, is created based on the driving time data thereof. The selected control rod is driven based on the timing table.

6 Claims, 4 Drawing Sheets

CONTROL ROD-DRIVING CONTROL APPARATUS AND A METHOD THEREOF

CROSS-REFERENCE TO RELATED APPLICATION

This application is based upon and claims the benefit of priority from Japanese Patent Application No. 2013-110111, filed on May 24, 2013; the entire contents of which are incorporated herein by reference.

FIELD

Embodiments described herein relate generally to a control rod-driving control apparatus and a method thereof for inserting/withdrawing a control rod into/from a nuclear reactor.

BACKGROUND

In a nuclear reactor of boiling water type, a plurality of control rods is located at a reactor core. Furthermore, at a lower part of a pressure vessel of the nuclear reactor, a control rod-driving mechanism for driving each control rod with insertion/withdrawal by high-pressure driving water is installed respectively.

In this control rod-driving mechanism, the high-pressure driving water is supplied from a driving water-supply device. Then, the driving water exhausted from the control rod-driving mechanism is returned to the driving water-supply device again. Component of this control-rod driving mechanism will be explained by referring to FIGS. 3 and 4. Here, among a plurality of control rods, one control rod and a driving mechanism corresponding thereto will be explained.

As shown in FIG. 3, a control rod 1 is connected to a piston 3 of a control rod-driving mechanism 20. In case of settling the control rod 1, the control rod 1 is held by a latch 4 set to a control rod-guide tube 2. Only when a load is applied along a direction to withdraw the control rod 1, this latch 4 is moved to hold the control rod 1 while the latch 4 does not disturb insertion motion of the control rod 1. In order for the control rod 1 to settle at a plurality of positions, a plurality of latches 4 is located along a longitudinal direction of the guide tube 2.

As to the driving water to give a pressure to an upper part or a lower part of the piston 3, a pressure thereof is risen by a driving water pump 5. Then, the driving water is supplied to the upper part of the piston 3 via a control valve for withdrawal direction (driving water side) 6, or the lower part of the piston 3 via a control valve for insertion direction (driving water side) 7. In this case, the driving water at the pressure side by motion of the piston 3 is exhausted via a control valve for withdrawal direction (exhaust water side) 8 or via a control valve for insertion direction (exhaust water side) 9.

When the control rod 1 is driven to be inserted, by opening the control valve for insertion direction (driving water side) 7 and by closing the control valve for withdrawal direction (driving water side) 6, the driving water is supplied to the lower part of the piston 3. At the same time, by opening the control valve for insertion direction (exhaust water side) 9 and by closing the control valve for withdrawal direction (exhaust water side) 8, the driving water of the upper part of the piston 3 is exhausted. As a result, the piston 3 is moved to an insertion direction, and the control rod 1 is driven to the insertion direction.

After driving the control rod 1 to be inserted at a predetermined distance, when the control rod 1 is to be settled, the control valve for insertion direction (driving water side) 7 and the control valve for insertion direction (exhaust water side) 9 are closed, and the control valve for withdrawal direction (exhaust water side) 8 is opened. As a result, the piston 3 is moved to the withdrawal direction. Here, by applying a load to the latch 4, the latch is held (settled) at a predetermined position.

When the control rod 1 is driven to be withdrawn, by opening the control valve for insertion direction (driving water side) 7 and the control valve for insertion direction (exhaust water side) 9, holding of the control rod 1 by the latch 4 is released (unlatch). Next, after closing the control valve for insertion direction (driving water side) 7 and the control valve for insertion direction (exhaust water side) 9, by opening the control valve for withdrawal direction (driving water side) 6, the driving water is supplied to the upper part of the piston 3. At the same time, by opening the control valve for withdrawal direction (exhaust water side) 8, the driving water of the lower part of the piston 3 is exhausted. As a result, the piston 3 is moved to a withdrawal direction, and the control rod 1 is driven to the withdrawal direction.

After driving the control rod 1 to be withdrawn at a predetermined distance, while the control valve for withdrawal direction (exhaust water side) 8 is being opened, the control valve for withdrawal direction (driving water side) 6 is closed. As a result, the piston 3 is moved to the withdrawal direction. Here, by applying a load to the latch 4, the latch 4 is held (settled) at a predetermined position.

In response to a control rod-selection command or a withdrawal/insertion-driving command from an operator, a control rod-driving control apparatus 10 outputs an open and close command to each control valve 6~9 of the control rod-driving mechanism 20 corresponding to the selected control rod 1. Here, a timing to open and close each control valve 6~9 when the selected control rod 1 is operated (such as unlatch, insertion, withdrawal, settle) is previously set according to a distance to insert or withdraw the selected control rod 1. FIG. 4A is an example of a timing table when the control rod 1 is driven to be inserted, and FIG. 4B is an example of a timing table when the control rod 1 is driven to be withdrawn. By operating open and close of each control valve according to timing tables shown in FIGS. 4A and 4B by the operator, the selected control rod is driven to be inserted or withdrawn at a predetermined distance.

For example, in the example of the timing table (when the control rod is driven to be inserted) shown in FIG. 4A, when 0.4 seconds have passed from a reference time, the operator opens the control valve for insertion direction (driving water side) 7 and the control valve for insertion direction (exhaust water side) 9. When 3.3 seconds have passed from the reference time, the operator closes both control valves, and opens the control valve for withdrawal direction (exhaust water side) 8. When 8.6 seconds have passed from the reference time, the operator closes the control valve for withdrawal direction (exhaust water side) 8. While these control valves 7, 8, 9 are being operated, the control valve for withdrawal direction (driving water side) 6 is continuously closed. Furthermore, in the example of the timing table (when the control rod is driven to be withdrawn) shown in FIG. 4B, the operator opens and closes each control valve 6~9 according to driving timings of FIG. 4B.

By the way, a driving velocity of the control rod 1 is determined by a differential pressure of the driving water supplied to the guide tube 2. Here, in accordance with change of the differential pressure, the driving velocity is also changed. Accordingly, by setting a flow control valve to a pipe to supply/exhaust the driving water and by controlling the flow control valve, the differential pressure is maintained as a predetermined value. As a result, change of the driving time is prohibited. This technique is disclosed in JPA (Kokai) PH6-174878.

In above-mentioned control rod-driving mechanism of conventional technique, the velocity to insert/withdraw the control rod 1 is basically determined by the differential pressure that the driving water (supplied to the guide tube 2) operates on the piston 3. Actually, due to a difference of mechanical characteristic of the control rod-driving mechanism 20 and each control valve 6~9 or a chronological change thereof, distribution to some extent exists among each velocity.

In order to correct the individual difference, the flow control valve is set to each control valve 6~9 respectively. By adjusting the flow and the differential pressure, the driving velocity is controlled to be constant. However, during driving, a validation test cannot be performed. Furthermore, if the flow control valve is adjusted during activating/driving, a nuclear-thermal hydraulics characteristic of the nuclear reactor is changed. As a result, while the nuclear reactor is being activated or driven, the flow control valve cannot be adjusted, which is a problem.

Furthermore, in the conventional technique, a timing to drive each control valve 6~9 is commonly set to all control rods 1, and cannot be set to each control rod 1 respectively. Briefly, a timing to operate unlatch, insertion, withdrawal and settle, cannot be adjusted and set to each control rod 1. Accordingly, if at least two control rods 1 are simultaneously driven, due to the difference of mechanical characteristic, dispersion exists among the driving velocity of each control rod 1. As a result, a difference occurs among moving difference of each control rod 1, and the difference is often over a permissible range. In this case, by an indication from a monitoring unit of abnormality variability, the driving operation of the control rod 1 is settled. As a result, it takes a long time for the restoration, and this situation badly affects on activation/operation of the nuclear reactor.

Furthermore, as to unlatch operation to be performed before withdrawal operation during driving the control rod, due to factors (individual difference, deterioration) of the machine side, the latch cannot be often released at the predetermined time. In this case, the unlatch time cannot be set respectively. In order to withdraw such control rod 1, the withdrawal operation must be performed a plurality of times. Briefly, complicated operation is necessary, which is a problem.

DETAILED DESCRIPTION

According to one embodiment, a control rod-driving control apparatus controls a plurality of driving mechanisms each differently connected to one of a plurality of control rods located in a nuclear reactor. A driving mechanism drives a connected control rod to be inserted and withdrawn with a high-pressure driving water by opening and closing a plurality of control valves of the driving mechanism. The apparatus includes a control rod-driving time measurement unit, a control rod selection unit, a timing table creation unit, and a control rod-driving control unit. The control rod-driving time measurement unit is configured to store driving time data of unlatch, insertion, withdrawal and settle of each control rod. The driving time data is measured by a test of insertion and withdrawal at a periodical inspection before starting operation of the nuclear reactor. The control rod selection unit is configured to select at least one from the plurality of control rods, based on a command to select and drive a control rod. The timing table creation unit is configured to create a timing table that prescribes timings to open and close each control valve to unlatch, insert, withdraw and settle a selected control rod, based on the driving time data of the selected control rod stored in the control rod-driving time measurement unit. The control rod-driving control unit is configured to drive the selected control rod, based on the timing table.

Various embodiments will be described hereinafter with reference to the accompanying drawings.

The First Embodiment

Figure 1:
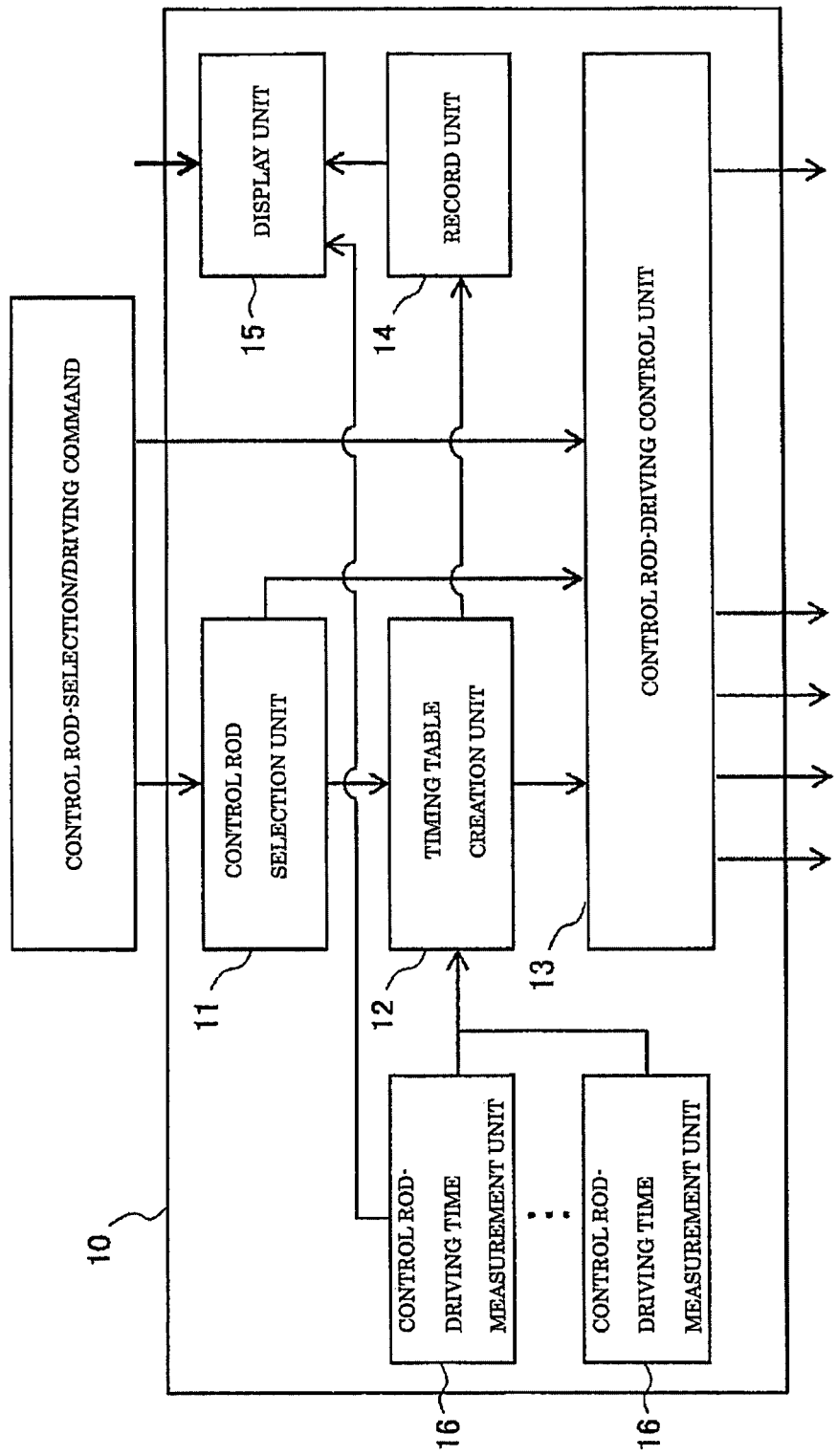
FIG. 1 is a block diagram of a control rod-driving control apparatus according to the first embodiment.
Figure 3:
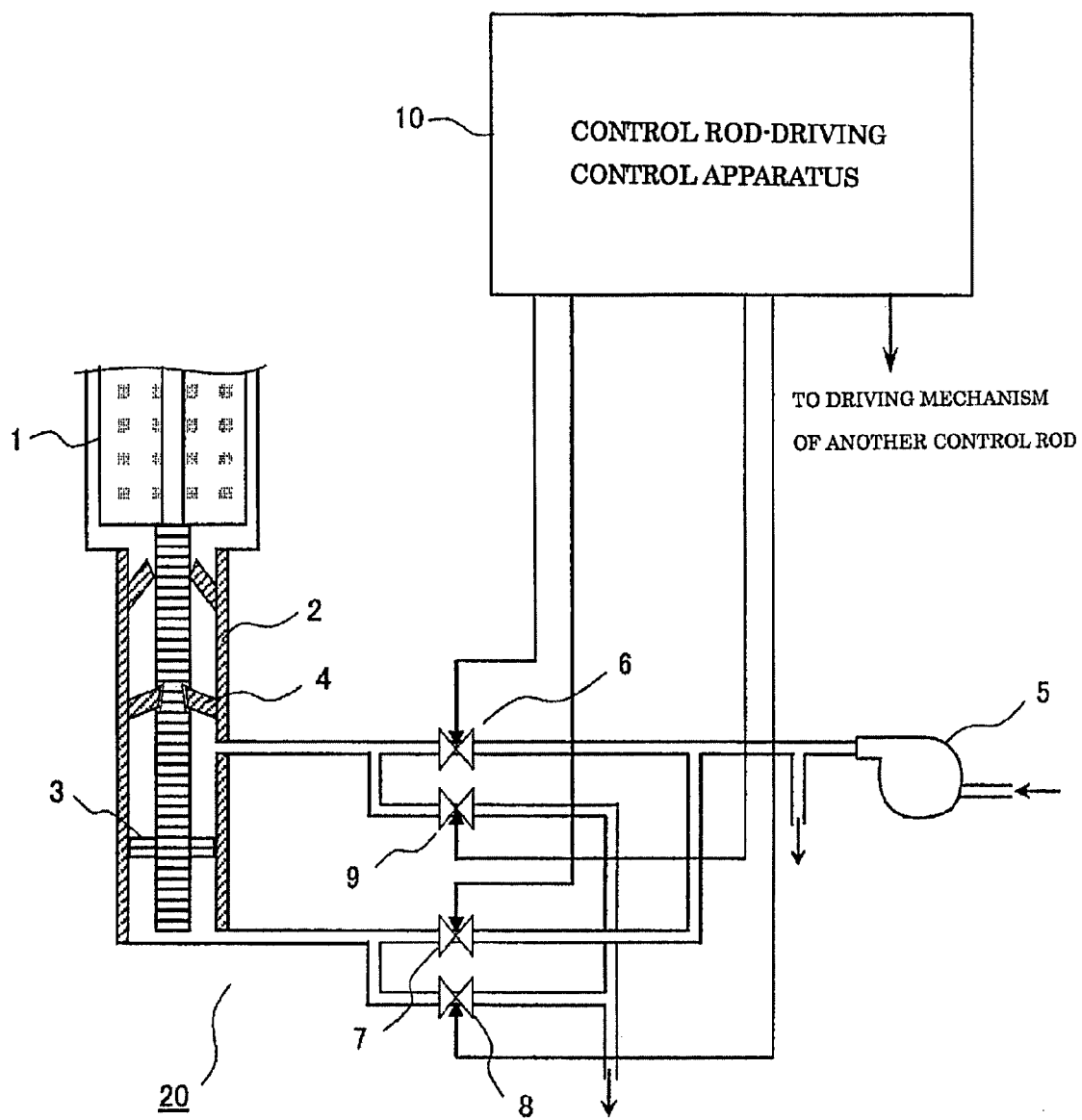
FIG. 3 is an entire block diagram of a mechanism for driving a control rod.
Figure 4A:
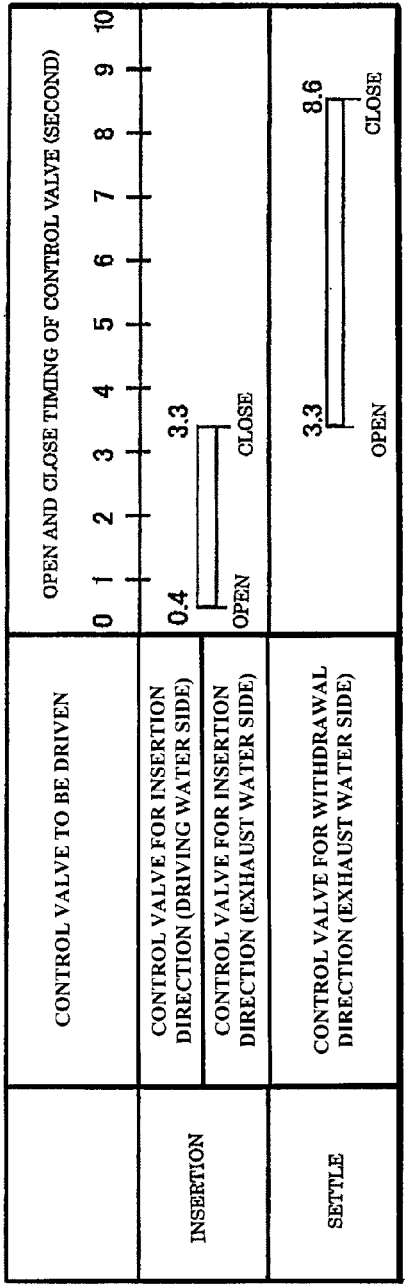
FIGS. 4A and 4B are examples of a timing table when a control rod is driven with insertion and a timing table when the control rod is driven with withdrawal.
Figure 4B:
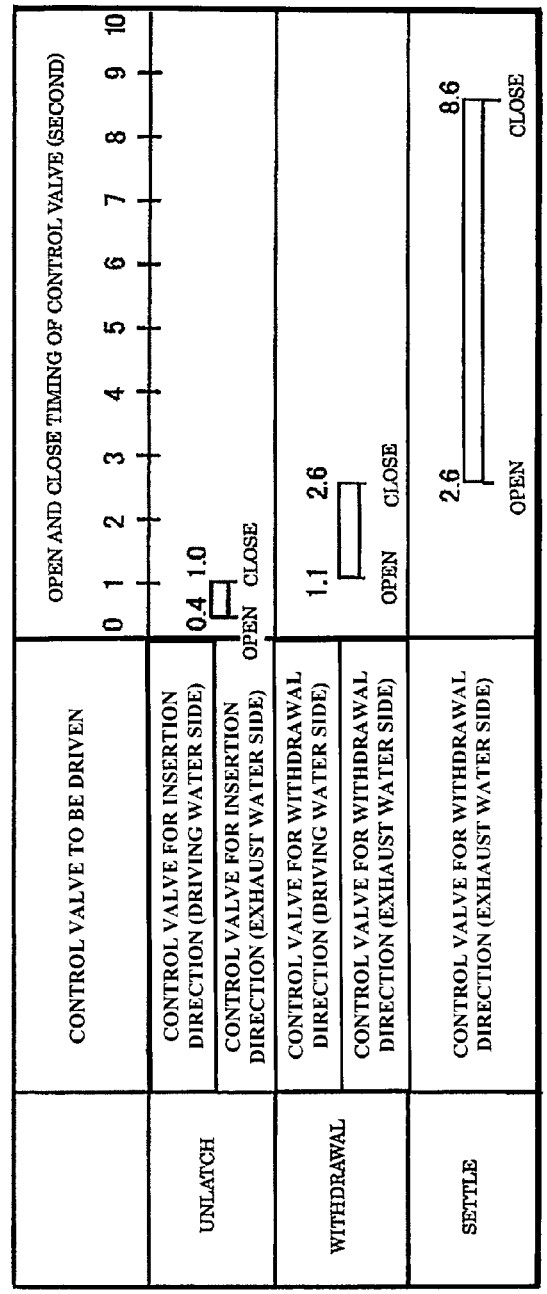

A control rod-driving control apparatus and a method thereof according to the first embodiment will be explained by referring to FIGS. 1, 3 and 4. In FIG. 1, as to the same or similar component as the control rod-driving control apparatus of conventional technique, the same sign is assigned, and explanation thereof is omitted.

(Component)

In the first embodiment, a control rod-driving control apparatus 10 includes following units. A control rod selection unit 11 selects one control rod to be driven from a plurality of control rods 1. A timing table creation unit 12 prescribes an open and close timing of each control valve 6~9 for the selected control rod. A control rod-driving control unit 13 sends an open and close signal to each control valve 6~9 of the control rod-driving mechanism 20 corresponding to the selected control rod 1. A record unit 14 records data of the timing table creation unit 12. A display unit 15 displays position information and measurement information of the control rod 1. A plurality of control rod-driving time measurement units 16 respectively measure a driving time of each control rod 1.

In the control rod-driving time measurement unit 16, at the periodical inspection before starting operation of the nuclear reactor, a test of all insertions or all withdrawals is performed for each control rod, and/or a test of insertion/withdrawal is performed for each latch. By these tests, in operation of unlatch, insertion, withdrawal and settle, driving time data such as open and close timing of each control valve is measured respectively. This measurement value is stored in the control rod-driving time measurement unit 16 corresponding to the control rod from which the measurement value is obtained.

(Function)

In the control rod-driving control apparatus 10 having above-mentioned components, a selection command of the control rod 1 to be driven, and a driving command indicating insertion/withdrawal and the driving distance, are inputted to the control rod selection unit 11 from an external central control room and so on. In response to this command, the timing table creation unit 12 extracts the driving time data from the control rod-driving time measurement unit 16 corresponding to the selected control rod 1. As to the selected control rod 1, the timing table creation unit 12 creates a timing table shown in FIG. 4A (when the control rod 1 is driven to be inserted) or FIG. 4B (when the control rod 1 is driven to be withdrawn).

According to the timing table created by the timing table creation unit 12, the control rod-driving control unit 13 opens and closes each control valve of the selected control rod 1, i.e., the control valve for withdrawal direction (driving water side) 6, the control valve for insertion direction (driving water side) 7, the control valve for withdrawal direction (exhaust water side) 8 and/or the control valve for insertion direction (exhaust water side) 9. As a result, the selected control rod 1 is driven to be inserted or withdrawn at a predetermined distance.

The record unit 14 records data created by the timing table creation unit 12. The display unit 15 suitably displays information of the timing table and the driving time.

Moreover, if a command to simultaneously drive a plurality of control rods 1 is received, the timing table creation unit 12 extracts each driving time data from the control rod-driving time measurement units 16 corresponding to the plurality of control rods 1. Based on contents of the command, the timing table creation unit 12 creates a timing table shown in FIG. 4A or 4B for each of the plurality of control rods 1. According to the timing table created by the timing table creation unit 12, the control rod-driving control unit 13 opens and closes each control valve of the plurality of control rods 1, i.e., the control valve for withdrawal direction (driving water side) 6, the control valve for insertion direction (driving water side) 7, the control valve for withdrawal direction (exhaust water side) 8 and/or the control valve for insertion direction (exhaust water side) 9. As a result, the plurality of control rod 1s is respectively driven to be inserted or withdrawn at a predetermined distance.

Furthermore, in the timing table creation unit 12, an upper limit and a lower limit (each previously determined) may be set to the open and close time of each control rod 6~9. When the timing table is created, if the open and close time of each control valve 6~9 is over a range between the upper limit and the lower limit, the open and close time is set to the upper limit or the lower limit.

(Effect) According to the first embodiment, the timing table of four operations (unlatch, insertion, withdrawal, settle) is created for each control rod. Accordingly, even if the control rod-driving mechanism (including a plurality of control valves) has distribution due to the individual difference or the chronological change, the selected control rod can be accurately inserted or withdrawn according to the command. As a result, reliability and safety of the control rod-driving mechanism can be raised.

The Second Embodiment

Figure 2:
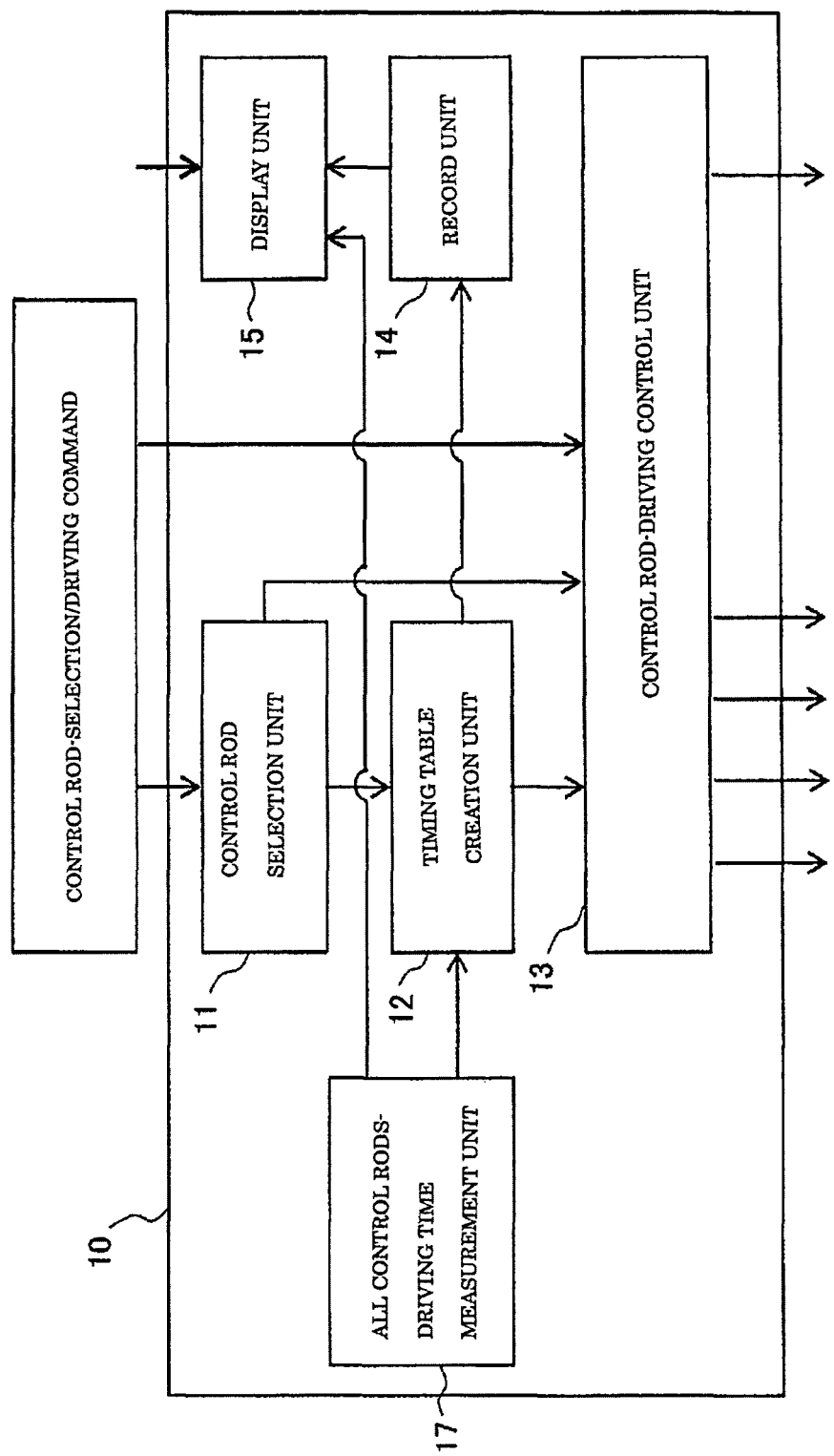
FIG. 2 is a block diagram of the control rod-driving control apparatus according to the second embodiment.

A control rod-driving control apparatus and a method thereof according to the second embodiment will be explained by referring to FIGS. 2, 3 and 4. In FIG. 2, as to the same or similar component as the control rod-driving control apparatus of the first embodiment, the same sign is assigned, and explanation thereof is omitted.

In the control rod-driving control apparatus 10 according to the second embodiment, in place of the control rod-driving time measurement unit 16 of the first embodiment, all control rods-driving time measurement unit 17 is equipped.

In the all control rod-driving time measurement unit 17, at the periodical inspection before starting operation of the nuclear reactor, a test of all insertions or all withdrawals is simultaneously performed for all control rod, and/or a test of insertion/withdrawal is simultaneously performed for each latch of all control rods. By these tests, in operation of unlatch, insertion, withdrawal and settle of each control rod, driving time data such as open and close timing of each control valve 6~9 is measured collectively. This measurement value is stored in the all control rod-driving time measurement unit 17.

A selection command of the control rod 1 to be driven, and a driving command indicating insertion/withdrawal and the driving distance, are inputted to the control rod selection unit 11 from an external central control room and so on. In response to this driving command, the timing table creation unit 12 extracts the driving time data from the all control rod-driving time measurement unit 17 corresponding to the selected control rod 1. Based on contents of the driving command, as to the selected control rod 1, the timing table creation unit 12 creates a timing table shown in FIG. 4A (when the control rod 1 is driven to be inserted) or FIG. 4B (when the control rod 1 is driven to be withdrawn).

According to the second embodiment, in addition to effect of the first embodiment, by using the all control rods-driving time measurement unit 17, the test of insertion/withdrawal (to be performed at the periodical inspection before starting operation of the nuclear reactor) can be performed in a short time. Accordingly, the test of insertion/withdrawal can be optimized and the periodical inspection can be shortened. Furthermore, the number of components of the control rod-driving control apparatus can be reduced.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for controlling a plurality of driving mechanisms each differently connected to one of a plurality of control rods located in a nuclear reactor,
   each driving mechanism driving a connected control rod to be inserted and withdrawn with a high-pressure driving water by opening and closing a plurality of control valves of the driving mechanism, the apparatus comprising:
   a control rod-driving time measurement unit configured to operate to store driving time data of unlatch, insertion, withdrawal and settle of each control rod,
   wherein the driving time data of each control rod is respectively measured by performing a test of insertion and withdrawal to each control rod at a periodical inspection before starting operation of the nuclear reactor;
   a control rod selection unit configured to operate to select at least one from the plurality of control rods, based on a command to select and drive a control rod;
   a timing table creation unit configured to operate to create a timing table that prescribes timings to open and close each control valve to unlatch, insert, withdraw and settle a selected control rod, based on the driving time data of the selected control rod stored in the control rod-driving time measurement unit; and a control rod-driving control unit configured to operate to drive the selected control rod, based on the timing table.

2. The apparatus according to claim 1, further comprising:

a record unit is configured to operate to record data of the timing table created by the timing table creation unit; and a display unit is configured to operate to display position information of the selected control rod.

3. The apparatus according to claim 1, wherein the timing table creation unit is configured to operate to set an upper limit and a lower limit used for prescribing the timings to open and close each control valve.

4. A method for controlling a plurality of driving mechanisms each differently connected to one of a plurality of control rods located in a nuclear reactor, each driving mechanism driving a connected control rod to be inserted and withdrawn with a high-pressure driving water by opening and closing a plurality of control valves of the driving mechanism, the method comprising:

operating a control rod-driving time measurement unit located at the nuclear reactor, to store driving time data of unlatch, insertion, withdrawal and settle of each control rod, wherein the driving time data of each control rod is respectively measured by performing a test of insertion and withdrawal to each control rod at a periodical inspection before starting operation of the nuclear reactor;

operating a control rod selection unit located at the nuclear reactor, to select at least one from the plurality of control rods, based on a command to select and drive a control rod;

operating a timing table creation unit located at the nuclear reactor, to create a timing table that prescribes timings to open and close each control valve to unlatch, insert, withdraw and settle a selected control rod, based on the driving time data of the selected control rod stored in the control rod-driving time measurement unit;

operating a control rod-driving control unit located at the nuclear reactor, to drive the selected control rod, based on the timing table; and operating a display unit to display position information of the selected control rod, wherein each of the respective units is distinct from each other respective unit.

5. An apparatus for controlling a plurality of driving mechanisms each differently connected to one of a plurality of control rods located in a nuclear reactor, each driving mechanism driving a connected control rod to be inserted and withdrawn with a high-pressure driving water by opening and closing a plurality of control valves of the driving mechanism, the apparatus comprising:

an all control rods-driving time measurement unit configured to operate to store driving time data of unlatch, insertion, withdrawal and settle of each control rod, wherein the driving time data of all control rods are collectively measured by simultaneously performing a test of insertion and withdrawal to all control rods at a periodical inspection before starting operation of the nuclear reactor;

a control rod selection unit configured to operate to select at least one from the plurality of control rods, based on a command to select and drive a control rod;

a timing table creation unit configured to operate to create a timing table that prescribes timings to open and close each control valve to unlatch, insert, withdraw and settle a selected control rod, based on the driving time data of the selected control rod stored in the all control rod-driving time measurement unit; and a control rod-driving control unit configured to operate to drive the selected control rod, based on the timing table.

6. A method for controlling a plurality of driving mechanisms each differently connected to one of a plurality of control rods located in a nuclear reactor, each driving mechanism driving a connected control rod to be inserted and withdrawn with a high-pressure driving water by opening and closing a plurality of control valves of the driving mechanism, the method comprising:

operating an all control rods-driving time measurement unit located at the nuclear reactor, to store driving time data of unlatch, insertion, withdrawal and settle of each control rod, wherein the driving time data of all control rods are collectively measured by simultaneously performing a test of insertion and withdrawal to all control rods at a periodical inspection before starting operation of the nuclear reactor;

operating a control rod selection unit located at the nuclear reactor, to select at least one from the plurality of control rods, based on a command to select and drive a control rod;

operating a timing table creation unit located at the nuclear reactor, to create a timing table that prescribes timings to open and close each control valve to unlatch, insert, withdraw and settle a selected control rod, based on the driving time data of the selected control rod stored in the all control rods-driving time measurement unit;

operating a control rod-driving control unit located at the nuclear reactor, to drive the selected control rod, based on the timing table; and operating a display unit to display position information of the selected control rod, wherein each of the respective units is distinct from each other respective unit.

* * * * *